3,661,934
PROCESS FOR PREPARING 2-(DIETHYLAMINO)-
ETHYL TETRAHYDRO - α - (1 - NAPHTHYL-
METHYL)-2-FURANPROPIONATE
Harold Berman, Norwich, N.Y., assignor to
Norton-Norwich Products, Inc.
No Drawing. Filed Oct. 9, 1969, Ser. No. 865,159
Int. Cl. C07d 5/04
U.S. Cl. 260—347.5         1 Claim

ABSTRACT OF THE DISCLOSURE

An improved process for preparing the titled compound is provided which comprises (a) catalytic reduction of ethyl-2-aceto-3-(2-furyl)acrylate to ethyl tetrahydro-α-acetyl-2-furanpropionate, (b) reaction of the product of (a) with 1-chloromethylnaphthalene in the presence of an alkali metal alkoxide to yield ethyl tetrahydro-α-(1-naphthylmethyl)-2-furanpropionate; and (c) transesterification of the product of (b) with 2-(diethylamino)ethanol followed by treatment with oxalic acid.

---

This invention relates to an improved process for the preparation of 2-(diethylamino)ethyl tetrahydro-α-(1-naphthylmethyl)-2-furanpropionate oxalate, a compound described in U.S. Pat. No. 3,334,096 and disclosed therein as having valuable antispasmodic and vasodilating properties. This compound has been prepared by a plurality of steps involving bromination of tetrahydrofurfuryl alcohol with phosphorus tribromide; reaction of the bromide with diethyl malonate to produce tetrahydrofurfuryl malonate; treatment of this malonate with 1-chloromethylnaphthalene to form diethyl 2-(1-methylnaphthalene)-2'-tetrahydrofurfurylmalonate; hydrolysis of this product to the corresponding acid; decarboxylation of this acid to yield α-(1-naphthylmethyl)-2-tetrahydrofuranpropionic acid; formation of an alkali metal salt thereof which is reacted with 2-(diethylamino)ethyl chloride; and finally salt formation with oxalic acid.

In accordance with the present invention a process for preparing 2-(diethylamino)ethyl tetrahydro-α-(1-naphthylmethyl) - 2 - furanpropionate oxalate is provided which involves a lesser number of steps; can be carried out with greater facility; and avoids the use of noxious reagents such as phosphorus tribromide and more expensive reagents such as tetrahydrofurfuryl alcohol, diethyl malonate and 2-(diethylamino)ethyl chloride. Such process is most readily depicted in the following schema:

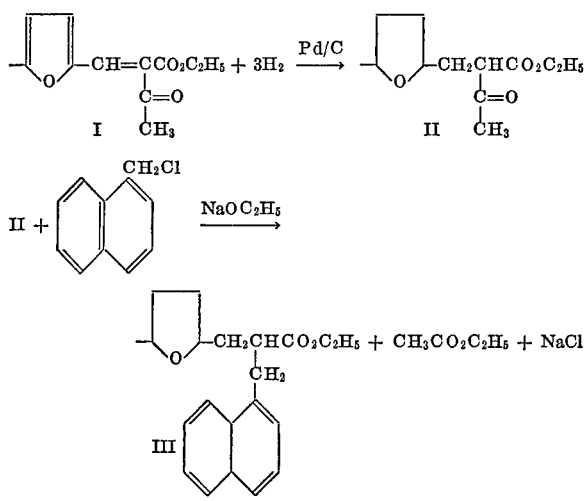

In the practice of the process of this invention, ethyl-2-aceto-3-(2-furyl)acrylate is hydrogenated in the presence of a catalyst such as palladium on carbon in an inert solvent such as ethanol to yield ethyltetrahydro-α-acetyl-2-furanpropionate which is reacted with 1-chloromethylnaphthalene preferably in the presence of an inert solvent such as xylene. The product thus produced, ethyl tetrahydro-α-(1-naphthylmethyl)-2 - furanpropionate, is transesterified with 2-(diethylamino)ethanol preferably in the presence of a catalyst such as sodium 2-(dimethylamino)ethoxide and under the influence of heat. The 2-(dimethylamino)ethyl tetrahydro-α-(1-naphthylmethyl)-2 - furanopropionate so obtained is readily converted to salt by contacting it with an acid such as oxalic preferably in the presence of a solvent such as acetone.

In order that this invention may be readily available to those skilled in the art an illustrative example is supplied:

(A) Ethyl-tetrahydro-α-acetyl-2-furanpropionate

A solution of 20.82 g. of ethyl-2-aceto-3-(2-furyl)acrylate (0.1 mole) in 200 ml. of absolute ethanol was reacted with hydrogen in a Parr shaker in the presence of 1 g. of 5% pallidium on carbon. The initial pressure with 47 lb./in.$^2$ and the final pressure was 22 lb./in.$^2$. The temperature increased during the reaction from 31° to 40° C. After absorption of hydrogen ceased, the catalyst was filtered, and the ethanol was removed from the filtrate by vacuum distillation at a final maximum temperature of 96° C. The residue weighed 21 g. The product was distilled in vacuo, B.P. 84–87° C. at 400–650 microns Hg. The distilled product weighed 19 g. or 91% yield based on the starting material. Elemental analysis of once distilled product was C=61.98%, H=8.66%. Calculated values are H=8.47%.

C=61.66%

(B) Ethyl-tetrahydro-α-(1-naphthylmethyl)-2-furanpropionate 1.84 g. of freshly cut sodium (0.080 atoms) was dissolved in a mixture of 15 ml. of absolute alcohol and 100 ml. of xylene. The rection flask was protected from atmospheric moisture with a tube packed with calcium chloride. After the sodium had dissolved, the excess ethanol was removed by fractionation through a 15 cm. Vigreux column.

The solution was cooled to 75° C., and a mixture of 17.11 g. of distilled ethyl tetrahydro-α-acetyl-2 - furanpropionate (.079 mole) and 14.20 g. of 1-chloromethyl naphthalene (0.080 mole) was introduced over a period of 23 minutes. The temperature was increased to 130° C.

in 35 minutes and maintained at 128–130° C. for 7 hours. A solid precipitated during the addition of the propionate and chloromethylnaphthalene mixture.

After cooling the reaction to room temperature, the solid was filtered and washed with ether. The solvent and all volatile materials boiling below 120° C. at 1.2–1.3 mm. Hg were removed from the filtrate by vacuum distillation. The maximum bath temperature was 180° C. The product remaining in the residue weighed 18.54 g.

10.66 g. of this syrupy residue was distilled in high vacuo; B.P. 166–172° C. at 150–170 microns of Hg. The weight of the distilled product was 8.13 g. Elemental analysis of the once distilled material was: C=77.58%, H=7.70%. Calculated values are: C=76.89%,

H=7.74%

The yield of distilled product was 56.7% based on ethyl tetrahydro-α-acetyl-2-furanpropionate.

(C) 2-(diethylamino)ethyl tetrahydro-α-(1-naphthylmethyl)-2-furanpropionate 84 mg. of freshly cut sodium (.0037 atom) was dissolved in 21.00 g. of 2-(diethylamino)ethanol (.179 mole) in a 50 ml. flask equipped with a 22 cm. long micro Vigreux column. The column was wrapped with a heating element and insulated. A thermocouple was buried under the insulation. 7.13 g. of distilled ethyl tetrahydro-α-(1-naphthylmethyl)-2-furanpropionate (.0228 mole) was added and the mixture was heated in a Dowtherm bath. The system was protected from atmospheric moisture with a tube packed with calcium chloride. The surface of the column was initially heated to 60° C., and its temperature was slowly increased to a maximum of 102° C. during the course of the reaction. After 1.13 hr. the bath temperature reached 146° C. from ambient temperature, and a liquid began condensing at the top of the column. The bath temperature was slowly raised to 171° C. during the next 1.8 hr. Total heating time was 2.87 hr. Liquid stopped distilling after 2.1 hr. of heating. Weight of distillate (ethanol) was 0.80 g. After cooling, the reaction mixture was filtered to remove a small amount of solid material. The filtrate was stripped of excess 2-(diethylamino)ethanol in vacuo at 5.75 mm. Hg. The last traces of the amino alcohol were removed by reducing the pressure to .6 mm. Hg and raising the bath temperature to 86° C. The residue weighed 8.63 g. Its IR was the same as a known sample of 2-(diethylamino)ethyl tetrahydro-α-(1-naphthylmethyl)-2-furanpropionate. The crude yield was 98.6% based on the ethyl ester.

(D) 2-(diethylamino)ethyl tetrahydro-α-(1-naphthylmethyl)-2-furanpropionate oxalate 2.84 g. of oxalic acid dihydrate (0.225 mole) was dissolved in 17.5 ml. of acetone at 45° C. This solution was added to a solution of 8.63 g. of crude 2-(diethylamino) ethyl tetrahydro-α-(1-naphthylmethyl)-2-furanpropionate (0.0225 mole) in 21 ml. of acetone. A small amount of precipitate formed which was filtered. The clear filtrate was cooled in an ice bath and scratched with a glass rod to initiate crystallization. After 3⅓ hrs., the product had crystallized. The solid was filtered and washed with 2 ml. of cold acetone and dried at room temperature in an evacuated dessicator over calcium chloride. Weight of product 7.40 g. having a M.P. of 109.5–110.5° C. or 69.5% yield based on the free base.

What is claimed is:

1. A process for preparing 2-(diethylamino)ethyl tetrahydro-α-(1-naphthylmethyl) - 2 - furanpropionate oxalate consisting of (a) the catalytic hydrogenation of ethyl 2-aceto-3-(2-furyl)acrylate in the presence of palladium on charcoal; (b) contacting the resultant ethyl tetrahydro-α-acetyl-2-furanpropionate with 1-chloromethylnaphthalene in the presence of sodium ethoxide; and (c) transesterifying the so produced ethyl tetrahydro-α-(1-naphthylmethyl)-2-furanpropionate with 2-(diethylamino)ethanol followed by salt formation with oxalic acid.

References Cited

UNITED STATES PATENTS 3,257,420  6/1966  Szarvasi et al. _____ 260—347.4
3,334,096  8/1967  Szarvasi et al. _____ 260—347.4

OTHER REFERENCES

Renfrow et al., J. of Organic Chem. (1948), vol. 70, pp. 3957–8.

Kaufmann et al., Chem. Abstracts (1924), vol. 18, pp. 1834–5.

ALEX MAZEL, Primary Examiner

B. DENTZ, Assistant Examiner